(12) United States Patent
Morikawa et al.

(10) Patent No.: US 9,046,599 B2
(45) Date of Patent: Jun. 2, 2015

(54) OBJECT DETECTION APPARATUS AND METHOD

(71) Applicant: FUJITSU LIMITED, Kawasaki-shi, Kanagawa (JP)

(72) Inventors: Takeshi Morikawa, Yokohama (JP); Koichi Tezuka, Kobe (JP); Koichi Iida, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 13/945,212

(22) Filed: Jul. 18, 2013

(65) Prior Publication Data

US 2014/0062759 A1 Mar. 6, 2014

(30) Foreign Application Priority Data

Sep. 6, 2012 (JP) .................................. 2012-196688

(51) Int. Cl.
| | |
|---|---|
| G01S 13/06 | (2006.01) |
| G01S 17/42 | (2006.01) |
| G01S 17/87 | (2006.01) |
| G01S 17/93 | (2006.01) |
| G01S 7/481 | (2006.01) |

(52) U.S. Cl.
CPC .................. *G01S 13/06* (2013.01); *G01S 17/42* (2013.01); *G01S 17/87* (2013.01); *G01S 17/936* (2013.01); *G01S 7/4817* (2013.01)

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 5,875,408 A | 2/1999 | Bendett et al. | |
| 2009/0072170 A1 | 3/2009 | Kurihara et al. | |
| 2013/0242285 A1* | 9/2013 | Zeng | ............................... 356/28 |

FOREIGN PATENT DOCUMENTS

| | | |
|---|---|---|
| DE | 10 2010 013 341 A1 | 1/2011 |
| DE | 10 2009 028 300 A1 | 2/2011 |
| DE | 10 2009 035 984 A1 | 2/2011 |
| JP | 3-164345 | 7/1991 |
| JP | 2006-300616 | 11/2006 |

OTHER PUBLICATIONS

Extended European Search Report issued Nov. 22, 2013 in corresponding European Patent Application No. 13176562.0.

\* cited by examiner

*Primary Examiner* — Luke Ratcliffe
(74) *Attorney, Agent, or Firm* — Staas & Halsey LLP

(57) ABSTRACT

An object detection apparatus includes: a first radar configured to measure first positional information regarding a first object existing in a first scan range; a second radar configured to measure second positional information regarding a second object existing in a second scan range on the basis of second reflected wave of second wave radiated onto the second scan range including the first region and a second region, the second wave being radiated in such a way as to scan the first region in a direction opposite a direction in which the first radar radiates the first wave; and a processor configured to detect a third object existing in the first region on the basis of the first positional information and the second positional information.

12 Claims, 14 Drawing Sheets

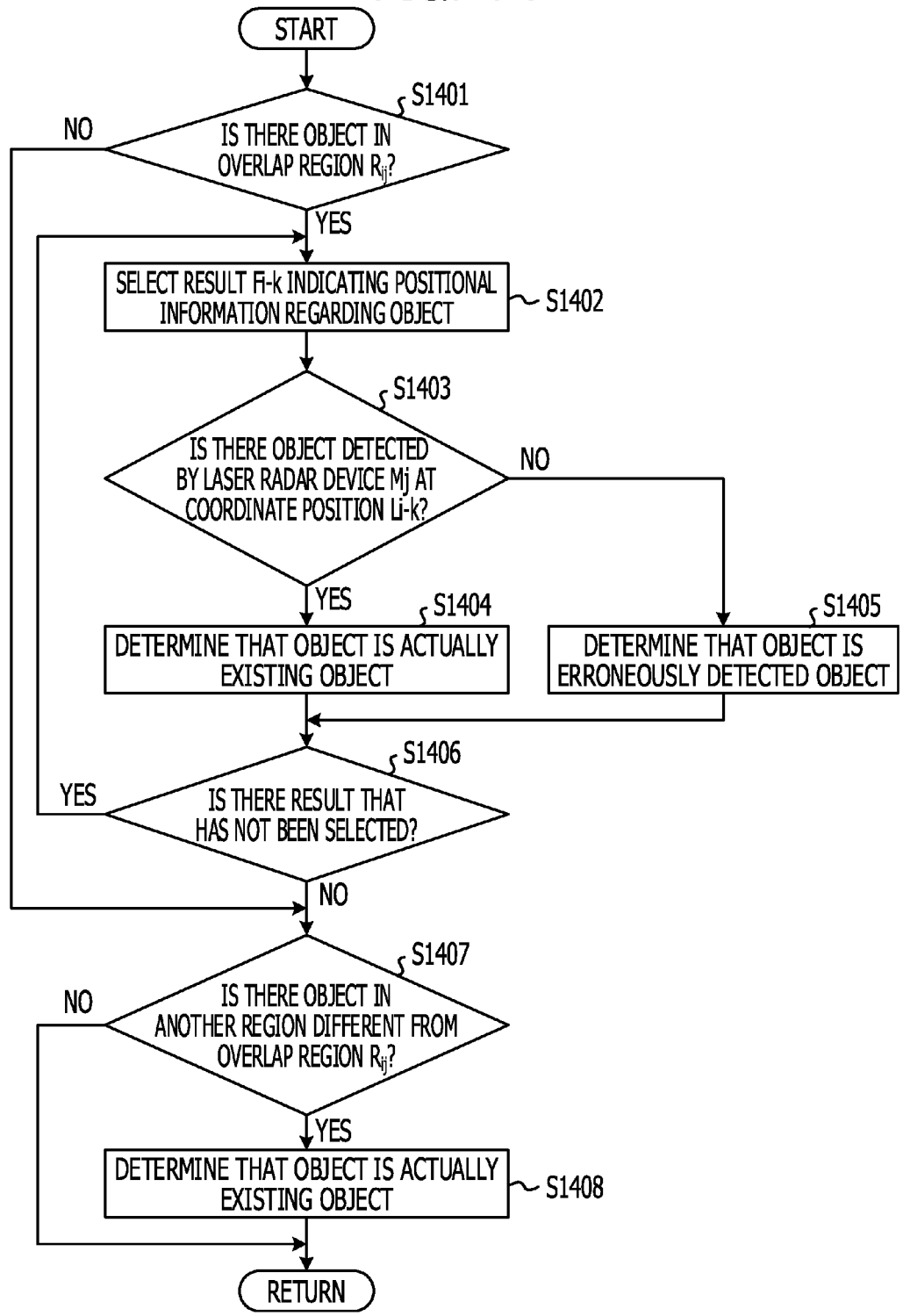

OBJECT DETECTION APPARATUS AND METHOD

CROSS-REFERENCE TO RELATED APPLICATION

This application is based upon and claims the benefit of priority from the prior Japanese Patent Application No. 2012-196688 filed on Sep. 6, 2012, the entire contents of which are incorporated herein by reference.

FIELD

The technique disclosed in the embodiment is related to a technique for detecting an object.

BACKGROUND

In these years, laser radar devices are more and more used for monitoring the surroundings of vehicles, buildings, and the like, and especially laser radar devices capable of performing wide angle scanning using two-dimensional scanners are gaining in popularity. In addition, in order to support operation and parking of a vehicle, a system that includes a plurality of laser radar devices mounted on the vehicle and that monitors all the surroundings of the vehicle has been proposed.

As an example of the related art, a technique has been disclosed in which a control unit that controls light-emitting timings of light-emitting sources in such a way as to provide light-emitting periods in which light is emitted to target space and off periods in which light is not emitted controls the light-emitting timings such that the light-emitting periods of the light-emitting sources of detection devices do not overlap. In addition, a technique has been disclosed in which it is determined that there is an obstacle only when the obstacle has been detected by at least two of four units, that is, a pair of laser light-emitting units and a pair of ultrasonic wave transmission units, provided on the front (or the back) of a vehicle in substantially the traveling direction of the vehicle. For example, these techniques are disclosed in Japanese Laid-open Patent Publication No. 2006-300616 and Japanese Laid-open Patent Publication No. 03-164345

SUMMARY

According to an aspect of the invention, an object detection apparatus includes: a first radar configured to measure first positional information regarding a first object existing in a first scan range on the basis of first reflected wave of first wave radiated onto the first scan range including a first region; a second radar configured to measure second positional information regarding a second object existing in a second scan range on the basis of second reflected wave of second wave radiated onto the second scan range including the first region and a second region, which is located outside the first scan range, the second wave being radiated in such a way as to scan the first region in a direction opposite a direction in which the first radar radiates the first wave at a timing at which the first radar scans the first region; and a processor configured to detect a third object existing in the first region on the basis of the first positional information obtained from the first radar and the second positional information obtained from the second radar.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a flowchart illustrating an example of a specific processing procedure of a process for determining an actually existing object.

DESCRIPTION OF EMBODIMENTS

Technical Problem

If a plurality of laser radar devices are used for monitoring the surroundings of a vehicle, a building, or the like in an example of the related art, an object might be erroneously detected when a certain laser radar device has received reflected light of laser light emitted from another laser radar device. For example, an object that does not actually exist might be erroneously detected when a laser radar device mounted on the left of a vehicle has received reflected light of laser light emitted by a laser radar device mounted on the front of the vehicle.

In an aspect, an object of the technique disclosed in the embodiment is to avoid erroneous detection of an object.

An object detection apparatus, an object detection program, and a vehicle according to an embodiment will be described in detail hereinafter with reference to the accompanying drawings.

Object Detection Apparatus According To Embodiment

Figure 1:
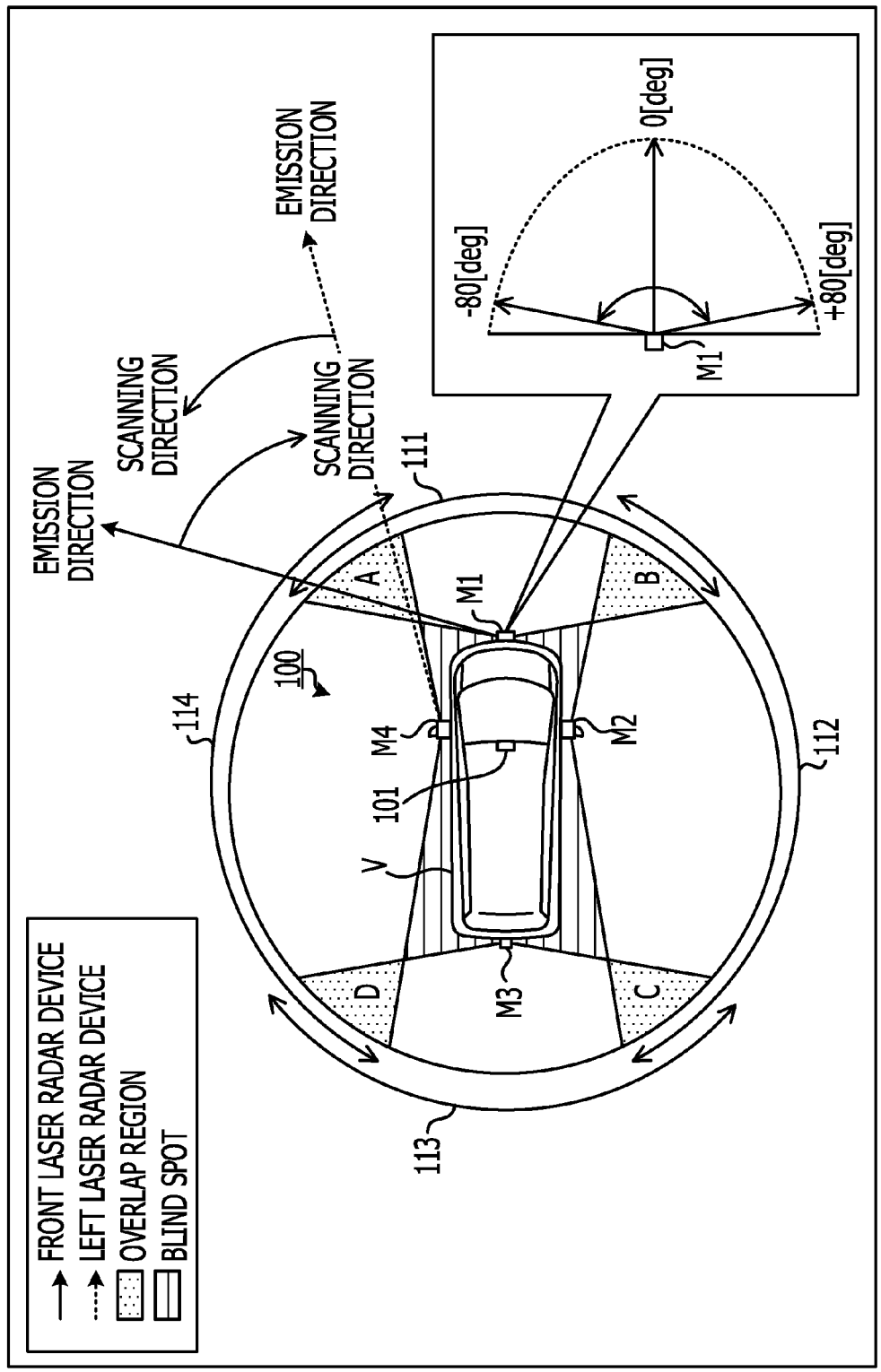
FIG. 1 is a diagram illustrating an object detection apparatus according to an embodiment.

FIG. 1 is a diagram illustrating the object detection apparatus according to the embodiment. In FIG. 1, an object detection apparatus 100 is a computer system that detects an object existing around a vehicle, a building, or the like. The vehicle may be transportation such as, for example, a car, an electric train, a train, or a motorcycle. The building may be a structure such as an office building, a house, or a warehouse.

With reference to FIG. 1, an example in which the object detection apparatus 100 detects an object existing around a vehicle V will be described. The object detection apparatus 100 includes a control device 101 and laser radar devices M1, M2, M3, and M4. In the object detection apparatus 100, the control device 101 is connected to the laser radar devices M1 to M4 by a wired or wireless network.

The control device 101 is a computer that detects an object on the basis of results of measurement performed by the laser radar devices M1 to M4. The laser radar devices M1 to M4 are measuring devices that measure positional information regarding an object by scanning their respective scan ranges while intermittently emitting laser light (so-called pulse emission) and receiving reflected laser light.

More specifically, for example, the laser radar devices M1 to M4 scan the scan ranges while emitting pulses of laser light at the same time intervals Δt or the same angular intervals Δθ. The time intervals Δt are time intervals at which laser light is emitted. The angular intervals AO indicate an angle (for example, a horizontal angle) between the direction of emission of laser light and the direction of next emission of laser light.

The laser radar devices M1 to M4 may each measure the distance to an object and the direction of the object on the basis of the time taken until reflected light is received after laser light is emitted and the emission direction of the laser light. The laser light is light amplified by stimulated emission, and has desirable directivity and convergence.

Laser light is generated by, for example, a laser oscillator that generates coherent light by amplifying light (electromagnetic wave). A scan range is a range in which scanning is performed using laser light. Scanning is to change the emission direction of laser light in a scan range. A specific example of the operation of the laser radar devices M1 to M4 will be described later with reference to FIG. 5.

In the example illustrated in FIG. 1, the laser radar device M1 is mounted on the front of the vehicle V, the laser radar device M2 is mounted on the right of the vehicle V, the laser radar device M3 is mounted on the back of the vehicle V, and the laser radar device M4 is mounted on the left of the vehicle V. The laser radar devices M1 to M4 are mounted on the vehicle V such that the relative positions of the laser radar devices M1 to M4 do not change.

In addition, the scan ranges of the laser radar devices M1 to M4 may be arbitrarily set. More specifically, for example, horizontal and vertical scan ranges are set to each of the laser radar devices M1 to M4 such that objects existing in all the surroundings of the vehicle V may be detected. The scan ranges of the laser radar devices M1 to M4 may be set in advance, or an operator may set the scan ranges of the laser radar devices M1 to M4 after mounting the laser radar devices M1 to M4 on the vehicle V.

In the example illustrated in FIG. 1, for example, a scan range of "−80 [deg.] to +80 [deg.]" is set to the laser radar device M1 as the horizontal scan range. It is assumed, however, that the traveling direction of the vehicle V is 0 [deg.], and the left to a light source (for example, a light-emitting unit 420 illustrated in FIG. 4, which will be described later) of the laser radar device M1 is a negative direction and the right to the light source is a positive direction.

In addition, for example, a scan range of "−80 [deg.] to +80 [deg.]" is set to the laser radar device M2 as the horizontal scan range. It is assumed, however, that a rightward direction perpendicular to the traveling direction of the vehicle V is 0 [deg.], and the left to a light source of the laser radar device M2 is a negative direction and the right to the light source is a positive direction.

In addition, for example, a scan range of "−80 [deg.] to +80 [deg.]" is set to the laser radar device M3 as the horizontal scan range. It is assumed, however, that a direction opposite the traveling direction of the vehicle V is 0 [deg.], and the left to a light source of the laser radar device M3 is a negative direction and the right to the light source is a positive direction.

In addition, for example, a scan range of "−80 [deg.] to +80 [deg.]" is set to the laser radar device M4 as the horizontal scan range. It is assumed, however, that a leftward direction perpendicular to the traveling direction of the vehicle V is 0 [deg.], and the left to a light source of the laser radar device M4 is a negative direction and the right to the light source is a positive direction.

Thus, by performing wide-angle scanning in a horizontal direction using laser light emitted from the laser radar devices M1 to M4, blind spots around the vehicle V, in which it is difficult for the object detection apparatus 100 to detect an object, may be reduced. As with the horizontal direction, by performing wide-angle scanning in a vertical direction using laser light emitted from the laser radar devices M1 to M4, blind spots around the vehicle V, in which it is difficult for the object detection apparatus 100 to detect an object, may be reduced.

The laser radar devices M1 to M4 receive all reflected light within their respective scan ranges. For this reason, when the laser radar devices M1 to M4 perform wide-angle scanning to reduce the blind spots around the vehicle V, radiation ranges in which laser light is radiated, that is, measurement ranges in which positional information regarding an object is measured, may overlap between the laser radar devices M1, M2, M3, and M4.

In the example illustrated in FIG. 1, there is an overlap region A between a radiation range 111 of the laser light of the laser radar device M1 and a radiation range 114 of the laser light of the laser radar device M4. In addition, there is an overlap region B between the radiation range 111 of the laser light of the laser radar device M1 and a radiation range 112 of the laser light of the laser radar device M2.

In addition, there is an overlap region C between the radiation range 112 of the laser light of the laser radar device M2 and a radiation range 113 of the laser light of the laser radar device M3. In addition, there is an overlap region D between the radiation range 113 of the laser light of the laser radar device M3 and the radiation range 114 of the laser light of the laser radar device M4.

Therefore, for example, when there is an object in the overlap region A, reflected light of the laser light radiated by the laser radar device M1 onto the object in the overlap region A might be received not only by the laser radar device M1 but also by the laser radar device M4. At this time, if the direction in which the laser radar device M4 radiates laser light is different from the direction of the overlap region A (for example, the direction of the overlap region D), an object might be erroneously detected in a region different from the overlap region A (for example, the overlap region D).

It is possible to mount a plurality of sensors of different types for detecting objects around the vehicle V in order to avoid erroneous detection of an object in a region such as the overlap region A. When sensors of different types are used, however, cost and the area occupied by the sensors undesirably increase compared to when sensors of the same type are used. In addition, it is possible to integrate a light-emitting unit and a light-receiving unit of each sensor in order to match the emission direction and a light-receiving direction, so that each sensor may receive only reflected light from the emission direction. In this case, however, the area occupied by a driving unit that drives the light-emitting unit and the light-receiving unit undesirably increases.

Therefore, in the present embodiment, the object detection apparatus 100 causes the laser radar devices M1 to M4 mounted on the vehicle V to emit pulses of laser light such that timings (periods) at which adjacent laser radar devices scan the same overlap region match. The object detection apparatus 100 then detects an object existing in the overlap region between the adjacent laser radar devices on the basis of results of measurement performed by the adjacent laser radar devices.

More specifically, for example, the laser radar device M4 scans the scan range thereof in a direction opposite the scanning direction of the laser radar device M1 such that a timing at which the laser radar device M4 scans the overlap region A matches with a timing at which the laser radar device M1 scans the overlap region A. In this case, the control device 101 detects an object existing in the overlap region A on the basis of a result of measurement performed by the laser radar device M1 and a result of measurement performed by the laser radar device M4.

More specifically, for example, the operator sets the scanning direction of the laser radar device M4 to be opposite the scanning direction of the laser radar device M1. In addition, the operator sets the intervals (for example, the time intervals Δt and the angular intervals Δθ) at which the laser radar device M4 emits laser light such that the timing at which the laser radar device M4 scans the overlap region A matches with the timing at which the laser radar device M1 scans the overlap region A.

Alternatively, the operator may input setting information regarding the scanning direction and the emission intervals of the laser radar device M1 and the like to the control device 101. In this case, the control device 101 may set the scanning direction and the emission intervals of the laser radar device M1 and the like in accordance with the input setting information.

In addition, for example, the laser radar device M2 scans the scan range thereof in a direction opposite the scanning direction of the laser radar device M1 such that a timing at which the laser radar device M2 scans the overlap region B matches with a timing at which the laser radar device M1 scans the overlap region B. In this case, the control device 101 detects an object existing in the overlap region B on the basis of a result of measurement performed by the laser radar device M1 and a result of measurement performed by the laser radar device M2.

In addition, for example, the laser radar device M3 scans the scan range thereof in a direction opposite the scanning direction of the laser radar device M2 such that a timing at which the laser radar device M3 scans the overlap region C matches with a timing at which the laser radar device M2 scans the overlap region C. In this case, the control device 101 detects an object existing in the overlap region C on the basis of a result of measurement performed by the laser radar device M2 and a result of measurement performed by the laser radar device M3.

Furthermore, for example, the laser radar device M3 scans the scan range thereof in a direction opposite the scanning direction of the laser radar device M4 such that a timing at which the laser radar device M3 scans the overlap region D matches with a timing at which the laser radar device M4 scans the overlap region D. In this case, the control device 101 detects an object existing in the overlap region D on the basis of a result of measurement performed by the laser radar device M3 and a result of measurement performed by the laser radar device M4.

Now, an example of detection of an object existing around the vehicle V will be described.

Figure 2:
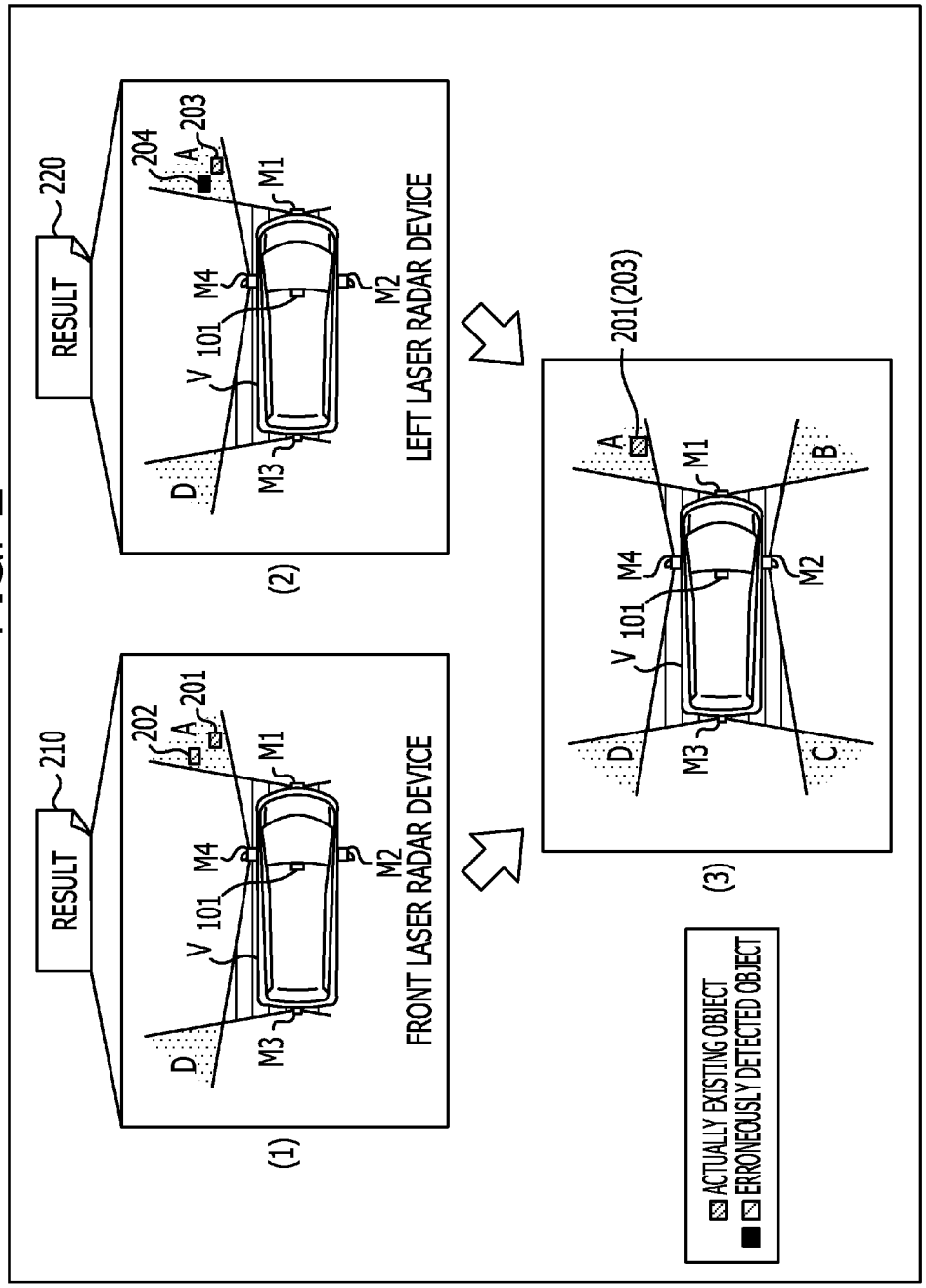
FIG. 2 is a diagram illustrating an example of detection of an object around a vehicle.

FIG. 2 is a diagram illustrating an example of detection of an object existing around the vehicle V. Here, an example of detection of an object existing in the overlap region A will be described while taking the laser radar devices M1 and M4 mounted on the vehicle V as an example.

(1) The control device 101 obtains a result 210 of measurement performed by the laser radar device M1. In the example illustrated in FIG. 2, the control device 101 determines from the result 210 of the measurement performed by the laser radar device M1 that objects 201 and 202 have been detected in the overlap region A.

(2) The control device 101 obtains a result 220 of measurement performed by the laser radar device M4. In the example illustrated in FIG. 2, the control device 101 determines from the result 220 of the measurement performed by the laser radar device M4 that objects 203 and 204 have been detected in the overlap region A. It is to be noted that the results 210 and 220 are obtained by the laser radar devices M1 and M4, respectively, at the same timing.

(3) The control device 101 determines whether or not the absolute coordinates of the objects (objects 201 and 202) identified from the result 210 match with the absolute coordinates of the objects (objects 203 and 204) identified from the result 220. If the absolute coordinates of the objects match, the control device 101 detects objects existing in the overlap region A. The absolute coordinates are, for example, a coordinate position represented by a distance from the center of the vehicle V.

In the example illustrated in FIG. 2, the absolute coordinates of the object 201 and the absolute coordinates of the object 203 match. Therefore, the control device 101 detects the object 201 (object 203) as an object existing in the overlap region A. The object 202 is an object erroneously detected by the laser radar device M1 by receiving reflected light that is originally emitted from the laser radar device M4 and reflected from the object 201 (object 203). The object 204 is an object erroneously detected by the laser radar device M4 by receiving reflected light that is originally emitted from the laser radar device M1 and reflected from the object 201 (object 203).

Thus, according to the object detection apparatus 100, it is possible to avoid erroneous detection of an object in an overlap region between adjacent two of the laser radar devices M1 to M4 mounted on the vehicle V. More specifically, for example, the scan ranges of the laser radar devices M1 and M4 may be scanned in opposite directions such that the timing at which the laser radar device M4 scans the overlap region A matches with the timing at which the laser radar device M1 scans the overlap region A.

In doing so, the laser radar devices M1 and M4 may intentionally detect objects erroneously detected by receiving reflected light of laser light emitted from the adjacent laser radar devices in the overlap region A. As a result, by comparing results of measurement of an overlap region between adjacent laser radar devices, it is possible to determine that an object detected by both the adjacent laser radar devices is an actually existing object and objects other than the foregoing object as erroneously detected objects.

In addition, by avoiding erroneous detection of an object in the overlap regions between adjacent laser radar devices, the laser radar devices M1 to M4 may perform scanning at wider angles using laser light and the blind spots around the vehicle V may be reduced, thereby providing a safer monitoring system.

Although a vehicle has been taken as an example of transportation (moving body) to which the object detection apparatus 100 is applied in the above description, the technique disclosed herein is not limited to this. For example, the object detection apparatus 100 may be applied to a moving body such as an airplane, a helicopter, or a ship, for whose operator there are blind spots. In addition, instead of the laser radar devices M1 to M4, measuring devices that measure the distances to objects and the directions of the objects by radiating ultrasonic waves and receiving reflected waves of the ultrasonic waves may be used.

(Example of Hardware Configuration of Object Detection Apparatus 100)

Figure 3:
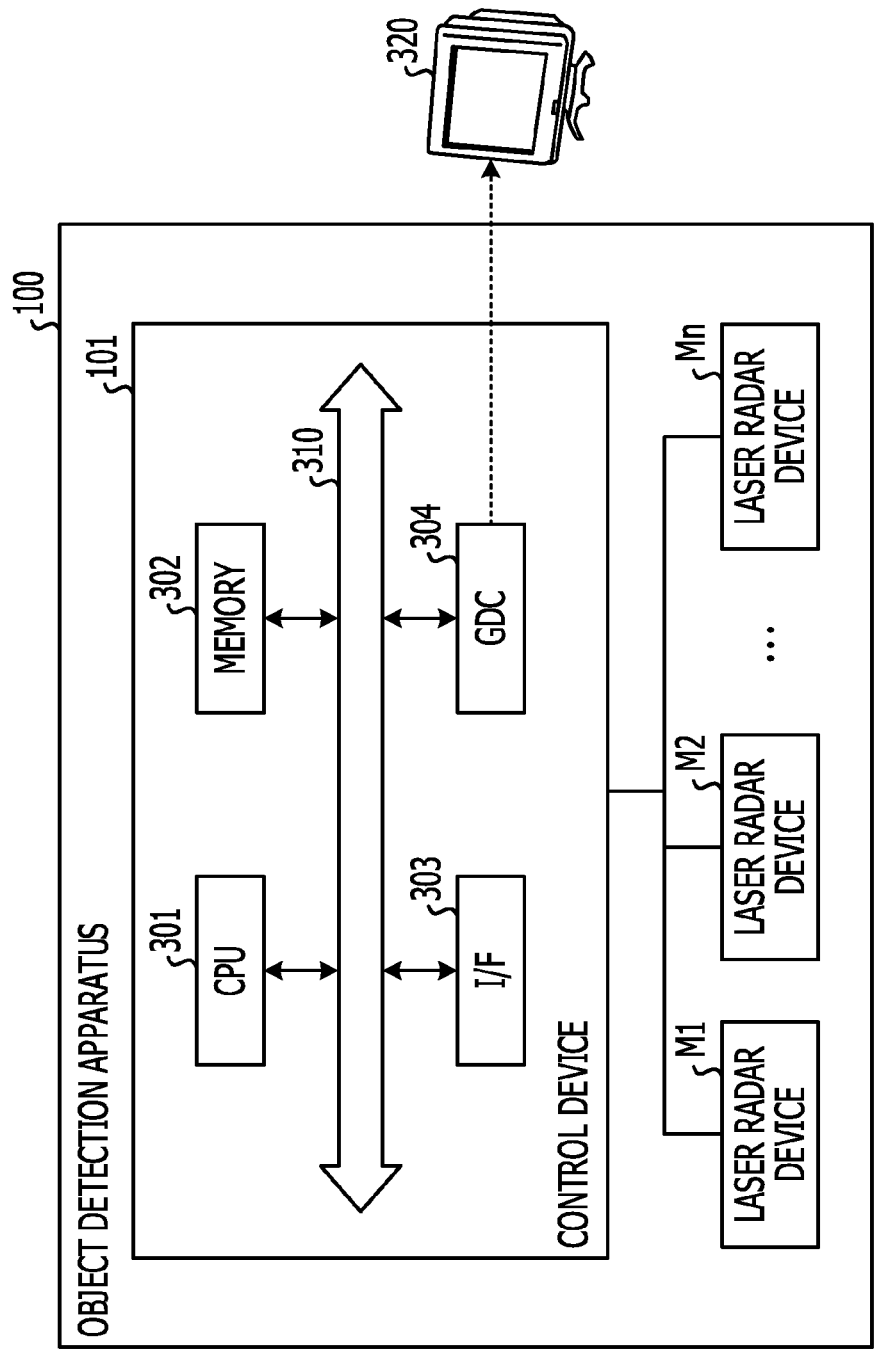
FIG. 3 is a block diagram illustrating an example of the hardware configuration of the object detection apparatus.

FIG. 3 is a block diagram illustrating an example of the hardware configuration of the object detection apparatus 100. In FIG. 3, the object detection apparatus 100 includes the control device 101 and laser radar devices M1 to Mn (n is a natural number equal to or larger than 2; n=4 in the example illustrated in FIG. 1). In the following description, an arbitrary one of the laser radar devices M1 to Mn may be referred to as a "laser radar device Mi" (i=1, 2, . . . , or n).

The control device 101 includes a central processing unit (CPU) 301, a memory 302, an interface (I/F) 303, and a graphics display controller (GDC) 304. The components are connected to one another by a bus 310.

The CPU 301 controls the entirety of the control device 101. The memory 302 includes, for example, a read-only memory (ROM), a random-access memory (RAM), and a flash ROM. More specifically, for example, the flash ROM stores programs such as an operating system (OS) and firmware, the ROM stores application programs, and the RAM is used as a work area of the CPU 301. The programs stored in the memory 302 cause the CPU 301 to execute coded processes when loaded into the CPU 301.

The I/F 303 controls input and output of data to and from external devices (for example, the laser radar devices M1 to Mn). More specifically, for example, the I/F 303 is connected to the wired or wireless network, and connected to the external devices through the network. The I/F 303 serves as an interface between the network and the inside of the control device 101, and controls input and output of data to and from the external devices.

The GDC 304 is a controller that performs a rendering process for a display 320. According to the GDC 304, the processing load on the CPU 301 caused by the rendering process may be reduced. The display 320 may, for example, be included in the object detection apparatus 100, or may be mounted on an in-vehicle device such as a navigation device, instead.

In addition to the above-described components, the object detection apparatus 100 may include, for example, an input device that inputs data such as characters, numbers, and various instructions. Alternatively, among the above-described components, the object detection apparatus 100 does not have to include the GDC 304. Next, a specific example of the hardware configuration of the laser radar device Mi will be described.

Figure 4:
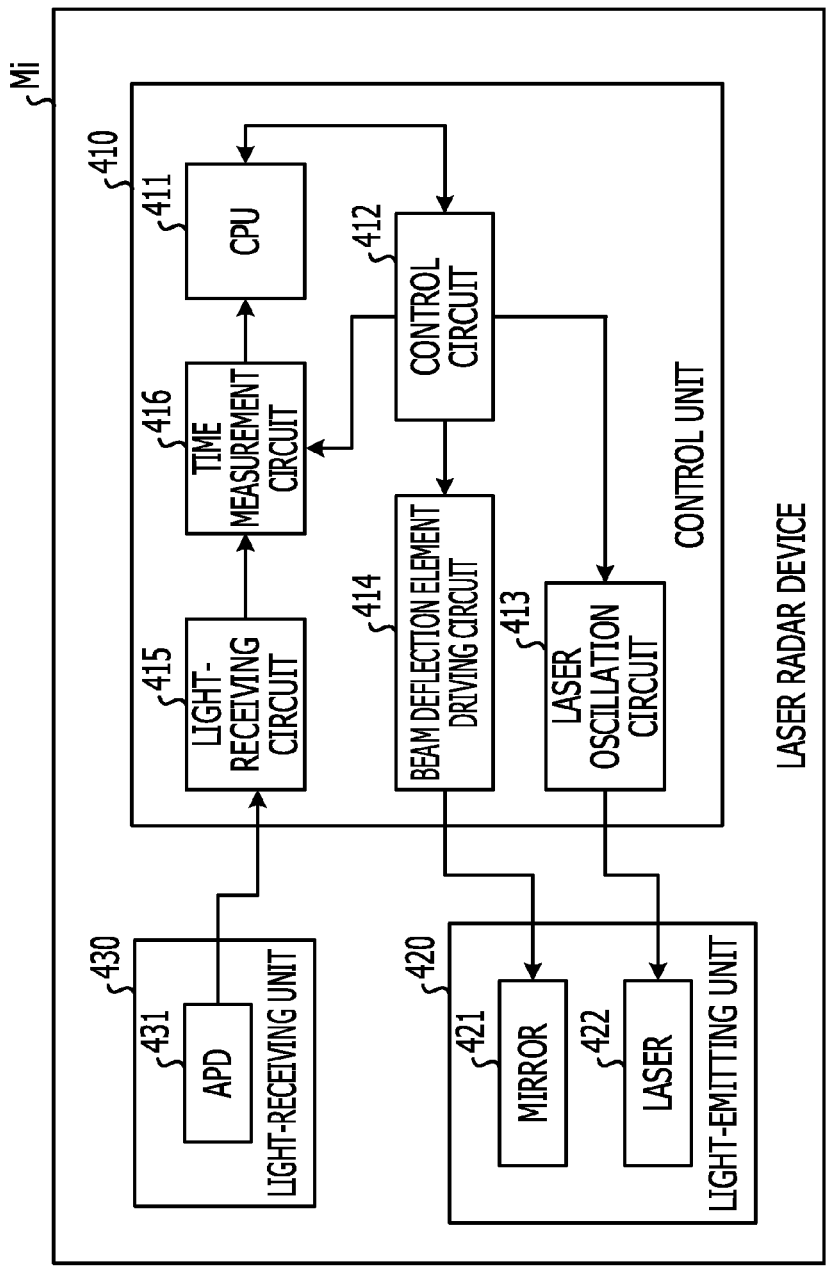
FIG. 4 is a block diagram illustrating an example of the hardware configuration of a laser radar device.

FIG. 4 is a block diagram illustrating an example of the hardware configuration of the laser radar device Mi. In FIG. 4, the laser radar device Mi includes a control unit 410, the light-emitting unit 420, and a light-receiving unit 430. The control unit 410 controls the entirety of the laser radar device Mi. The light-emitting unit 420 emits laser light. The light-receiving unit 430 receives reflected light of the laser light.

More specifically, the control unit 410 includes a CPU 411, a control circuit 412, a laser oscillation circuit 413, a beam deflection element driving circuit 414, a light-receiving circuit 415, and a time measurement circuit 416. The light-emitting unit 420 includes a mirror 421 and a laser 422. The light-receiving unit 430 includes an avalanche photodiode (APD) 431.

The CPU 411 controls the entirety of the control unit 410. The control circuit 412 transmits timing signals of laser pulses to the laser oscillation circuit 413 and a start signal to the time measurement circuit 416 in accordance with the control performed by the CPU 411. In addition, the control circuit 412 transmits signals regarding scanning order to the beam deflection element driving circuit 414 in synchronization with the timing signals of laser pulses in order to drive the mirror 421 of the light-emitting unit 420.

The laser 422 emits laser light. The laser light emitted from the light-emitting unit 420 and reflected from an object (reflected light) is received by the light-receiving circuit 415 through the APD 431 of the light-receiving unit 430. Upon receiving the reflected light, the light-receiving circuit 415 transmits a stop signal to the time measurement circuit 416. The CPU 411 calculates a distance on the basis of a time difference $\Delta T$ between the start signal and the stop signal of laser pulses received by the time measurement circuit 416.

More specifically, for example, the CPU 411 may calculate a distance Z to a target (object) using the following expression (1). Here, c denotes the speed of light (for example, c≈300,000 [km/s]).

$$Z = (c \times \Delta T)/2 \qquad (1)$$

(Example of Operation of Laser Radar Device Mi)

Figure 5:
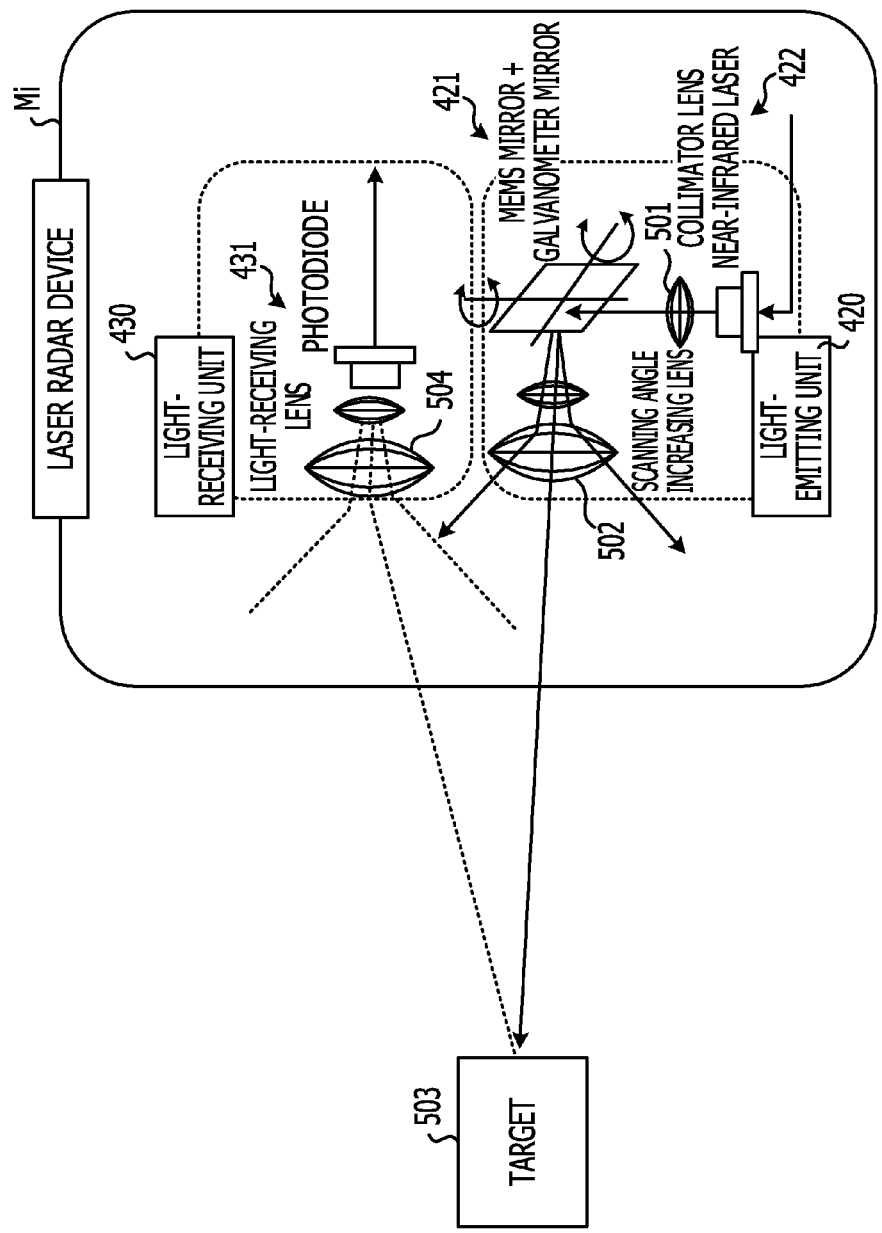
FIG. 5 is a diagram illustrating an example of the operation of the laser radar device.

Next, a specific example of the operation of the laser radar device Mi will be described. FIG. 5 is a diagram illustrating an example of the operation of the laser radar device Mi. In FIG. 5, the light-emitting unit 420 and the light-receiving unit 430 of the laser radar device Mi are illustrated. In the example illustrated in FIG. 5, a near-infrared laser is used as the laser 422, and a combination between a microelectromechanical systems (MEMS) mirror and a galvanometer mirror is used as the mirror 421.

For example, the laser radar device Mi may horizontally change the emission direction of laser light using the MEMS mirror and vertically change the emission direction of laser light using the galvanometer mirror, in order to realize a two-dimensional scan range. Alternatively, the laser radar device Mi may realize the two-dimensional scan range by combining two MEMS mirrors or using a single MEMS mirror with which two-dimensional scanning may be performed.

The laser light emitted from the laser 422 is incident on the mirror 421 through a collimator lens 501. The laser light reflected from the mirror 421 is emitted from the light-emitting unit 420 through a scanning angle increasing lens 502. The laser light emitted from the light-emitting unit 420 is reflected from a target 503, and then received by the APD 431 through a light-receiving lens 504 of the light-receiving unit 430.

(Example of Scanning Order of Laser Radar Device Mi)

Figure 6:
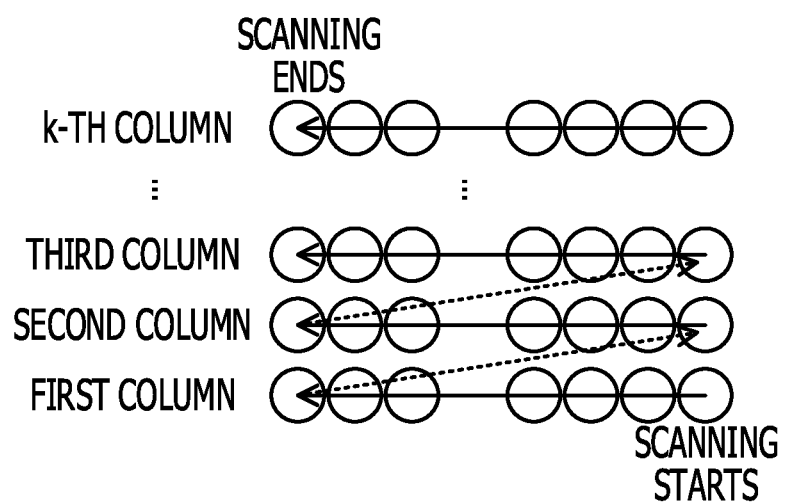
FIG. 6 is a diagram illustrating an example of the scanning order of the laser radar device.

Here, an example of the scanning order of the laser radar device Mi will be described. FIG. 6 is a diagram illustrating an example of the scanning order of the laser radar device Mi. In FIG. 6, an example of scanning order in which the laser radar device Mi scans the scan range thereof is illustrated. In FIG. 6, each hollow circle represents one operation for emitting laser light performed by the laser radar device Mi.

More specifically, when scanning has begun and horizontal scanning in a first row has been completed, the laser radar device Mi returns to a right end while moving up to a next row, and performs horizontal scanning in a second row. When horizontal scanning in a k-th row has been completed, the laser radar device Mi ends the scanning.

In the following description, a group of results obtained by scanning the entirety of the scan range of the laser radar device Mi may be referred to as "a result of measurement for each frame".

(Specific Example of Result of Measurement Performed by Laser Radar Device Mi)

Figure 7:
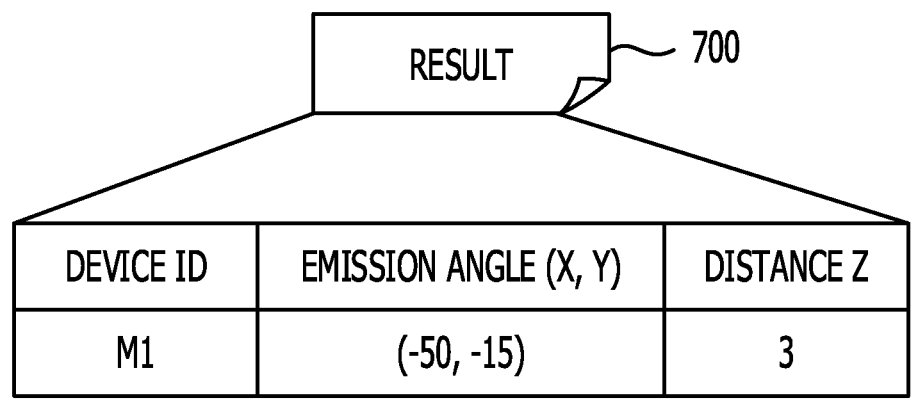
FIG. 7 is a diagram illustrating a specific example of a result of measurement performed by the laser radar device.

Next, a result of measurement performed by the laser radar device Mi will be described. FIG. 7 is a diagram illustrating a specific example of a result of measurement performed by the laser radar device Mi. In FIG. 7, a result 700 of measurement is information indicating a device identifier (ID), emission angles (X, Y), and the distance Z.

Here, the device ID is identification information regarding the laser radar device Mi. The emission angles indicate the emission direction of laser light, and represent a direction in which a target exists relative to the laser radar device Mi. X denotes the horizontal emission angle [deg.] of laser light, and Y denotes the vertical emission angle [deg.] of laser light. The distance Z is a distance from the laser radar device Mi to the target. The distance Z is, for example, a value calculated by using the above expression (1).

According to the result 700 of measurement, it is possible to identify a target located 3 m away from the laser radar device M1 in a direction of emission angles (−50 [deg.], −15 [deg.]).

Alternatively, the result 700 of measurement may include time information for identifying a time at which the result 700 of measurement has been obtained. The time information indicates, for example, a time at which a start signal has been received by the time measurement circuit 416 (refer to FIG. 4) or a time at which a stop signal has been received by the time measurement circuit 416. Alternatively, the result 700 of measurement may include, instead of the distance Z, the time at which a start signal has been received by the time measurement circuit 416 and the time at which a stop signal has been received by the time measurement circuit 416 or the time difference ΔT.

(Specific Example of Device Information Table 800)

Next, a device information table 800 used by the control device 101 will be described. The device information table 800 is, for example, stored in the memory 302 of the control device 101 illustrated in FIG. 3.

Figure 8:
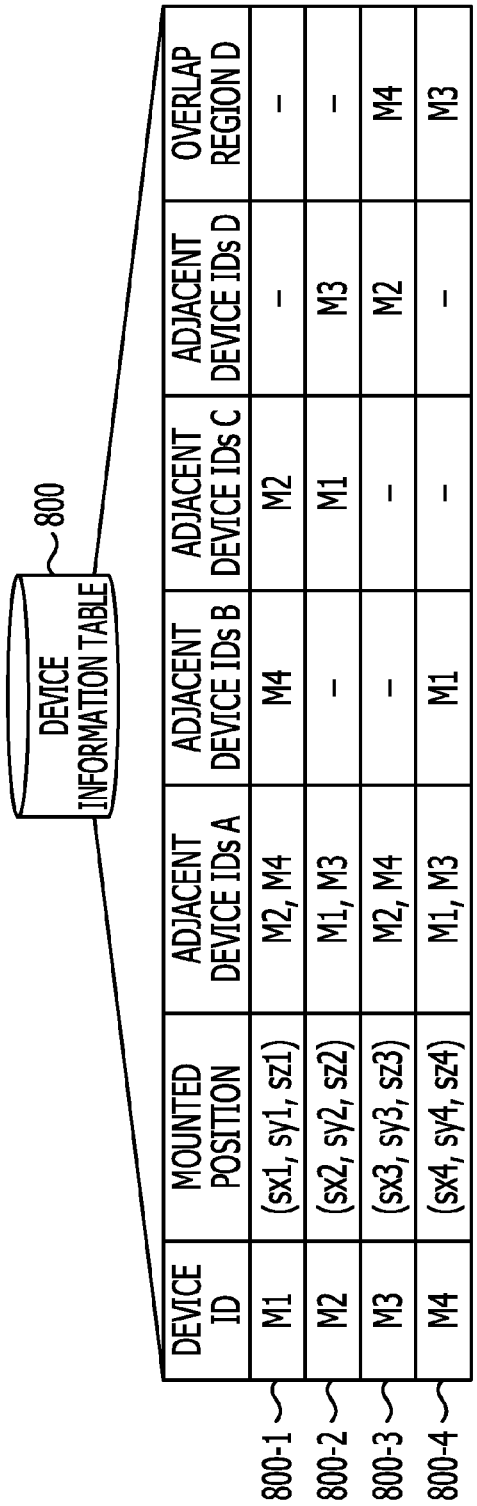
FIG. 8 is a diagram illustrating a specific example of a device information table.

FIG. 8 is a diagram illustrating a specific example of the device information table 800. In FIG. 8, the device information table 800 includes fields of device ID, mounted position, adjacent device IDs, and overlap regions A to D. By setting information in each field, device information 800-1 to 800-4 regarding the laser radar devices M1 to M4, respectively, is stored as a record.

Here, the device ID is identification information regarding the laser radar device Mi. The mounted position is absolute coordinates representing the coordinate position of the laser radar device Mi mounted on the vehicle V relative to the center of the vehicle V. The adjacent device IDs are identification information regarding laser radar devices adjacent to the laser radar device Mi, that is, laser radar devices whose radiation regions overlap the radiation region of the laser radar device Mi. The overlap regions A to D are information for identifying overlap regions between the laser radar device Mi and adjacent laser radar devices.

For example, according to the device information 800-1, the mounted position (sx1, sy1, sz1) of the laser radar device M1 and the adjacent device IDs "M2, M4" regarding the laser radar devices M2 and M4, which are located adjacent to the laser radar device M1, may be identified. In addition, it may be identified that the radiation region of the laser radar device M1 and the radiation region of the laser radar device M4 overlap in the overlap region A. In addition, it may be identified that the radiation region of the laser radar device M1 and the radiation region of the laser radar device M2 overlap in the overlap region B.

(Overlap Region Table 900)

Next, an overlap region table 900 used by the control device 101 will be described. The overlap region table 900 is, for example, stored in the memory 302 of the control device 101.

Figure 9:
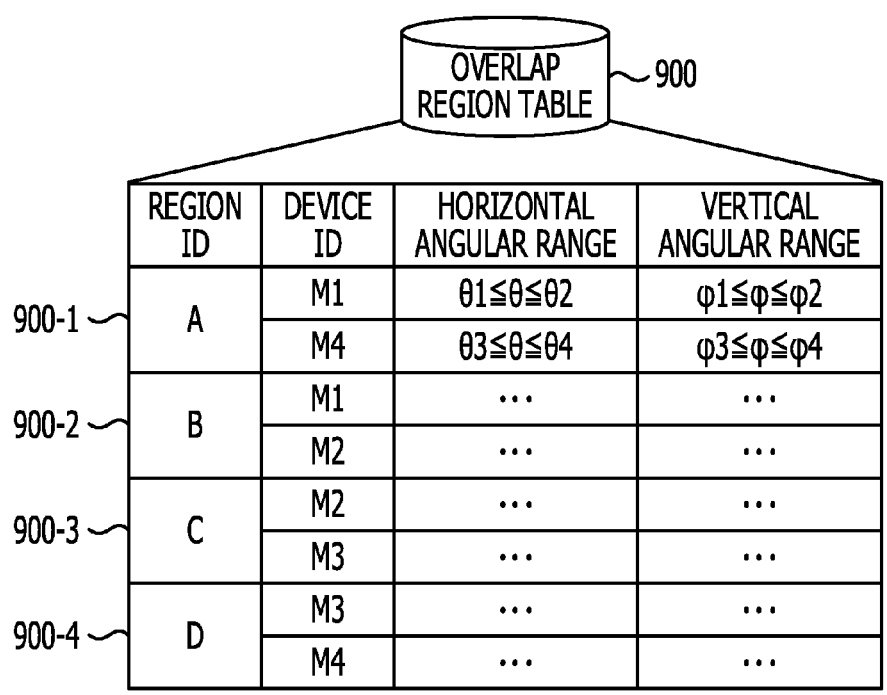
FIG. 9 is a diagram illustrating a specific example of an overlap region table.

FIG. 9 is a diagram illustrating a specific example of the overlap region table 900. In FIG. 9, the overlap region table 900 includes fields of region ID, device IDs, horizontal angular range, and vertical angular range. By setting information in each field, overlap region information 900-1 to 900-4 regarding the overlap regions A to D, respectively, is stored as a record.

Here, the region ID is identification information regarding an overlap region. The device IDs are identification information regarding laser radar devices that share an overlap region. The horizontal angular range indicates a horizontal angular range relative to the laser radar device Mi in which an overlap region exists. The vertical angular range indicates a vertical angular range relative to the laser radar device Mi in which an overlap region exists.

For example, according to the overlap region information 900-1, the device IDs "M1, M4" regarding laser radar devices that share the overlap region A may be identified. In addition, the horizontal angular range "θ1≤θ≤2" and the vertical angular range "φ1≤φ≤φ2" relative to the laser radar device M1 in which the overlap region A exists may be identified. The horizontal angular range "θ3≤θ≤θ4" and the vertical angular range "φ3≤φ≤φ4" relative to the laser radar device M4 in which the overlap region A exists may be identified.

The overlap region information 900-1 to 900-4 may be directly input to the control device 101 by an operation performed by the operator, or may be created by the control device 101 on the basis of the scan ranges of the laser radar devices M1 to M4.

(Example of Functional Configuration of Control Device 101)

Figure 10:
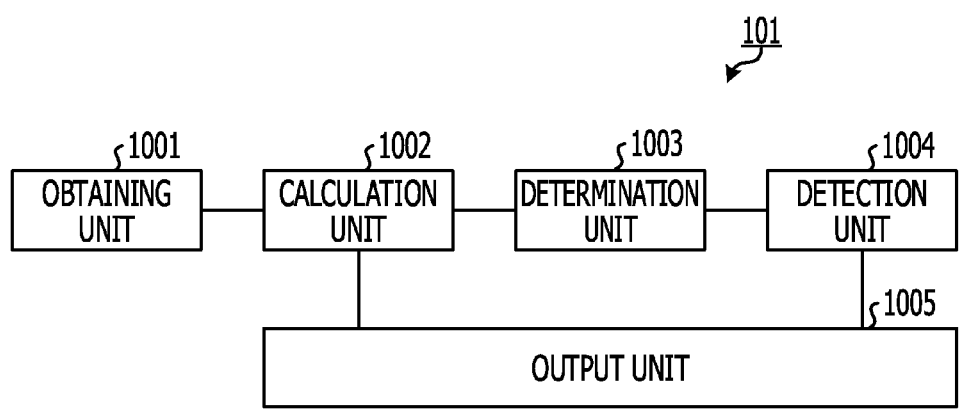
FIG. 10 is a block diagram illustrating an example of the functional configuration of a control device.

Next, an example of the functional configuration of the control device 101 of the object detection apparatus 100 will be described. FIG. 10 is a block diagram illustrating an example of the functional configuration of the control device 101. In FIG. 10, the control device 101 includes an obtaining unit 1001, a calculation unit 1002, a determination unit 1003, a detection unit 1004, and an output unit 1005. The obtaining unit 1001 to the output unit 1005 are functions that serve as control units. More specifically, for example, the functions are realized by causing the CPU 301 to execute the programs stored in the memory 302 illustrated in FIG. 3 or by the I/F 303. Results of processing performed by these function units are, for example, stored in the memory 302.

In the following description, a laser radar device adjacent to the laser radar device Mi may be referred to as a "laser radar device Mj" (i≠j and j=1, 2, . . . , or n). An overlap region in which the radiation region of the laser radar device Mi and the radiation region of the laser radar device Mj may be referred to as an "overlap region $R_{ij}$".

The obtaining unit 1001 has a function of obtaining a result Fi of measurement performed by the laser radar device Mi from the laser radar device Mi. The result Fi includes positional information regarding an object measured by the laser radar device Mi. The positional information regarding an object is, for example, information indicating the direction (the horizontal angle X and the vertical angle Y) of the object and the distance Z to the object from the laser radar device Mi. The result Fi is, for example, the result 700 illustrated in FIG. 7.

More specifically, for example, the obtaining unit 1001 obtains the result Fi transmitted from the laser radar device Mi each time the laser radar device Mi obtains the result Fi. When the positional information regarding an object has not been obtained by the laser radar device Mi, the result Fi is information indicating that an object has not been detected.

The calculation unit 1002 has a function of calculating a coordinate position Li of an object on the basis of the result Fi obtained by the laser radar device Mi. Here, the coordinate position Li of an object is, for example, absolute coordinates indicating a distance from an origin to the object in a spatial coordinate system (three-dimensional Cartesian coordinate system) defined by a dX axis (horizontal angle), a dY axis (vertical angle), and a dZ angle (distance).

For example, in the case of the laser radar device Mi mounted on the front of the vehicle V, the origin (0, 0, 0) in the spatial coordinate system is the center of the vehicle V. The dX axis of the spatial coordinate system is, for example, a rightward axis passing through the origin and perpendicular to the traveling direction of the vehicle V. The dY axis of the spatial coordinate system is, for example, a vertical axis passing through the origin. The dZ axis of the spatial coordinate system is, for example, an axis in the traveling direction passing through the origin. The dX axis and the dY axis change depending on the direction (forward, backward, rightward, or leftward) of the laser radar device Mi.

More specifically, for example, first, the calculation unit 1002 corrects the coordinates of the result Fi of the measurement from the mounted position of the laser radar device Mi to the origin (the center of the vehicle V) using the following expressions (2), (3), and (4). Here, (X [deg.], Y [deg.], Z [m]) indicates the direction (the horizontal angle Z and the vertical angle Y) of an object and the distance Z to the object identified from the result Fi of the measurement performed by the laser radar device Mi. (sx [m], sy [m], sz [m]) indicates the mounted position of the laser radar device Mi. (x' [m], y' [m], z' [m]) indicates coordinates obtained as a result of the correction.

$$x' = Z \cdot \cos Y \cdot \sin X + sx \quad (2)$$

$$y' = Z \cdot \cos Y \cdot \sin Y + sy \quad (3)$$

$$z' = Z \cdot \cos Y \cdot \cos X + sz \quad (4)$$

Next, the calculation unit 1002 calculates the absolute coordinates of the object using the following expressions (5), (6), and (7). Here, (dX [deg.], dY [deg.], dZ [m]) is the absolute coordinates of the object relative to the origin, which is the center of the vehicle V.

$$dX = \arctan(x'/z') \quad (5)$$

$$dY = \arctan(y'/z') \quad (6)$$

$$dZ = z'/\{\cos(dX) \cdot \cos(dY)\} \quad (7)$$

Now, the mounted position (sx1, sy1, sz1) of the laser radar device M1 is assumed to be (0, 0, 2), and an example of calculation of the absolute coordinates of an object will be described while taking the result 700 illustrated in FIG. 7 as an example.

First, the calculation unit 1002 substitutes "(X, Y, Z)=(−50, −15, 3)" indicated by the result 700 for the above expressions (2) to (4) in order to calculate the coordinates (x', y', z') obtained as a result of the correction. Results of the calculation are as follows.

$$x' = 3 \cdot \cos(-15) \cdot \sin(-50) + 0 = -2.22 \text{ [m]}$$

$$y' = 3 \cdot \cos(-50) \cdot \sin(-15) + 0 = -0.50 \text{ [m]}$$

$$z' = 3 \cdot \cos(-15) \cdot \cos(-50) + 2 = 3.86 \text{ [m]}$$

The calculation unit 1002 then substitutes "(x', y', z')=(−2.22, −0.50, 3.86)", which are the coordinates obtained as a result of the correction, for the above expressions (5) to (7) in order to calculate the absolute coordinates (dX, dY, dZ) of the object. Results of the calculation are as follows.

$$dX = \arctan(-2.22/3.86) = -29.90 \text{ [deg.]}$$

$$dY = \arctan(-0.50/3.86) = -7.38 \text{ [deg.]}$$

$$dZ = 3.86/\{\cos(-29.90) \cdot \cos(-7.38)\} = 4.49 \text{ [m]}$$

When the forward direction of the vehicle V is assumed to be 0 [deg.] and the angle is assumed to increase up to 360 [deg.] in clockwise rotation, for example, dX=360−29.90=330.1 [deg.] (the absolute coordinates relative to the center of the vehicle V are X=330.1 [deg.], Y=−7.38 [deg.], and Z=4.49 [m]).

Now, an example of calculation of the absolute coordinates of the object will be described while assuming the mounted position (sx4, sy4, sz4) of the laser radar device M4 to be (1, 0.5, 1) and a result F4 of measurement performed by the laser radar device M4 to be "(X, Y, Z)=(20, −5, 5)".

First, the calculation unit 1002 substitutes "(X, Y, Z)=(20, −5, 5)" indicated by the result F4 for the above expressions (2) to (4) in order to calculate (x', y', z'), which is coordinates obtained as a result of correction. Results of the calculation are as follows.

$$x' = 5 \cdot \cos(-5) \cdot \sin(20) + 1 = 2.70 \text{ [m]}$$

$$y' = 5 \cdot \cos(20) \cdot \sin(-5) + 0.5 = 0.09 \text{ [m]}$$

$$z' = 5 \cdot \cos(-5) \cdot \cos(20) + 1 = 5.68 \text{ [m]}$$

The calculation unit 1002 then substitutes "(x', y', z')=(2.70, 0.09, 5.68)", which is the coordinates obtained as a result of the correction, for the above expressions (5) to (7) in order to calculate the absolute coordinates (dX, dY, dZ) of the object. Results of the calculation are as follows.

$$dX = \arctan(2.70/5.68) = 25.42 \text{ [deg.]}$$

$$dY = \arctan(0.09/5.68) = 0.91 \text{ [deg.]}$$

$$dZ = 5.68/\{\cos(25.42) \cdot \cos(0.91)\} = 6.29 \text{ [m]}$$

When the forward direction of the vehicle V is assumed to be 0 [deg.] and the angle is assumed to increase up to 360 [deg.] in clockwise rotation, for example, dX=270+25.42=295.42 [deg.] (the absolute coordinates relative to the center of the vehicle V are X=295.42 [deg.], Y=0.91 [deg.], and Z=6.29 [m]).

The result Fi may include, instead of the distance Z, a time at which a start signal has been received by the time measurement circuit 416 and a time at which a stop signal has been received by the time measurement circuit 416 or the time difference ΔT. In this case, for example, the calculation unit 1002 may calculate the distance Z to the object using the above expression (1). The calculated coordinate position Li of the object is, for example, associated with the result Fi and stored in the memory 302.

The determination unit 1003 has a function of determining whether or not the coordinate position Li of an object obtained from the result Fi of measurement of the overlap region $R_{ij}$ performed by the laser radar device Mi and a coordinate position Lj of an object identified from a result Fj of measurement of the overlap region $R_{ij}$ performed by the laser radar device Mj match.

More specifically, for example, the determination unit 1003 compares the coordinate positions Li and Lj of objects obtained from the results Fi and Fj of measurement performed by the laser radar devices Mi and Mj, respectively, at the same time. The measurement time of the result Fi may be, for example, identified from the time information included in the result Fi.

When the laser radar devices Mi and Mj scan the same scan range (the same horizontal angular range and the same vertical angular range) at the same emission intervals, the determination unit 1003 may compare the results Fi and Fj themselves sequentially transmitted from the laser radar devices Mi and Mj, respectively.

At this time, the determination unit 1003 may determine that the coordinate positions Li and Lj of objects match when the coordinate positions Li and Lj of objects perfectly match. Alternatively, the determination unit 1003 may determine that the coordinate positions Li and Lj of objects match when a difference between the coordinate positions Li and Lj of objects is within a predetermined range.

Here, for example, "i" of the laser radar device Mi is assumed to be "1". In this case, for example, the determination unit 1003 refers to the device information table 800 (refer to FIG. 8) and identifies the laser radar device M4 (j=4) adjacent to the laser radar device M1. In addition, the determination unit 1003 refers to the device information table 800 and identifies the overlap region A ($R_{ij}$=A) between the laser radar device M1 and the laser radar device M4.

Next, the determination unit 1003 refers to the overlap region information 900-1 in the overlap region table 900 and identifies the result F1 of measurement of the overlap region A performed by the laser radar device M1. In addition, the determination unit 1003 refers to the overlap region information 900-1 in the overlap region table 900 and identifies the result F4 of measurement of the overlap region A performed by the laser radar device M4.

The determination unit 1003 then determines whether or not the coordinate position L1 of an object obtained from the identified result F1 of measurement of the overlap region A and the coordinate position L4 of an object identified from the result F4 of measurement of the overlap region A match. The coordinate position Li of an object is, for example, the absolute coordinates of an object calculated by the calculation unit 1002.

The detection unit 1004 has a function of detecting an object existing in the overlap region $R_{ij}$ on the basis of a result of a determination made by the determination unit 1003. More specifically, for example, the detection unit 1004 detects an object existing in the overlap region $R_{ij}$ when the determination unit 1003 has determined that the coordinate positions Li and Lj of objects match. On the other hand, when it has been determined that the coordinate positions Li and Lj of objects do not match, the detection unit 1004 determines that the objects identified from the results Fi and Fj are erroneously detected objects.

Alternatively, the detection unit 1004 may detect an object existing in another region AR different from the overlap region $R_{ij}$ on the basis of the result Fi of measurement of the other region AR performed by the laser radar device Mi. More specifically, for example, the detection unit 1004 detects an object identified from the result Fi of measurement of the other region AR.

The output unit 1005 has a function of outputting a result of detection performed by the detection unit 1004. More specifically, for example, the output unit 1005 may output information indicating that there is an object in the overlap region $R_{ij}$ (for example, a region located ahead of a left part of the vehicle V). Alternatively, the output unit 1005 may output information indicating that there is an object in the other region AR (for example, a region located to the left of the vehicle V) different from the overlap region $R_{ij}$.

In addition, the output unit 1005 may output the coordinate position Li (absolute coordinates) of an object existing in the overlap region $R_{ij}$. Alternatively, the output unit 1005 may output the coordinate position Li (absolute coordinates) of an object existing in the other region AR different from the overlap region $R_{ij}$. In addition, the output unit 1005 may create a three-dimensional image of space around the vehicle V on the basis of the detected result, and output the three-dimensional image to the display 320.

The control device 101 may, for example, receive setting information regarding the laser radar device Mi through an input operation performed by a user using an input apparatus, which is not illustrated. Here, the setting information includes information for scanning the scan range such that the scan ranges of adjacent laser radar devices are scanned in opposite directions (opposite phases) and timings at which the adjacent laser radar devices scan the overlap region match. More specifically, for example, the setting information is information indicating the scan range, the scanning direction, the scanning speed, and the emission intervals of the laser radar device Mi and the like.

In addition, the control device 101 may communicate with the laser radar device Mi and set the scan range, the scanning direction, the emission intervals, and the emission timings of the laser radar device Mi and the like on the basis of the received setting information regarding the laser radar device Mi.

More specifically, for example, the same scan range (the same horizontal angular range and the same vertical angular range) and the same emission intervals are set to the laser radar devices M1 to Mn. In addition, a scanning direction opposite the scanning direction of the adjacent laser radar device Mj is set to the laser radar device Mi. The emission intervals are, for example, specified by the time intervals Δt or the angular intervals Δθ.

That is, the control device 101 sets various pieces of scan information to the laser radar device Mi such that the laser radar devices M1 to Mn scan their respective scan ranges in the same period. In the laser radar device Mi, the control unit 410 controls the light-emitting unit 420 in accordance with the set pieces of scan information in order to perform scanning using laser light.

Thus, the control device 101 may obtain results of measurement performed by the laser radar devices M1 to Mn at the same time by instructing the laser radar devices M1 to Mn to perform scanning using laser light at the same timing.

When the horizontal angular range of the scan range is different between adjacent laser radar devices, the time taken to horizontally scan one line is different, and accordingly the timing at which the overlap region is scanned is different. In this case, for example, the control device 101 may adjust the emission intervals of the laser radar device Mj in accordance with the laser radar device Mi that takes longer time to scan one line.

For example, the horizontal angular range of the laser radar device M1 is set to "−80 [deg.] to +80 [deg.]", and the horizontal angular range of the laser radar device M4 is set to "−60 [deg.] to +60 [deg.]". The laser radar devices M1 and M4 are assumed to emit laser light while horizontally moving by one degree at intervals of 1 second.

That is, the laser radar device M1 takes 160 seconds to scan one line, whereas the laser radar device M4 takes 120 seconds to scan one line. In this case, for example, the control device 101 may match the periods in which the laser radar devices M1 and M4 scan one line by adjusting the emission intervals of the laser radar device M4 such that the laser radar device M4 emits laser light while horizontally moving by one degree at intervals of 4/3 seconds.

(Example of Determination Using Result of Measurement for Each Frame)

Next, an example of a determination as to whether or not the coordinate position Li of an object and the coordinate position Lj of an object match using a result of measurement for each frame performed by the laser radar device Mi will be described.

Figure 11:
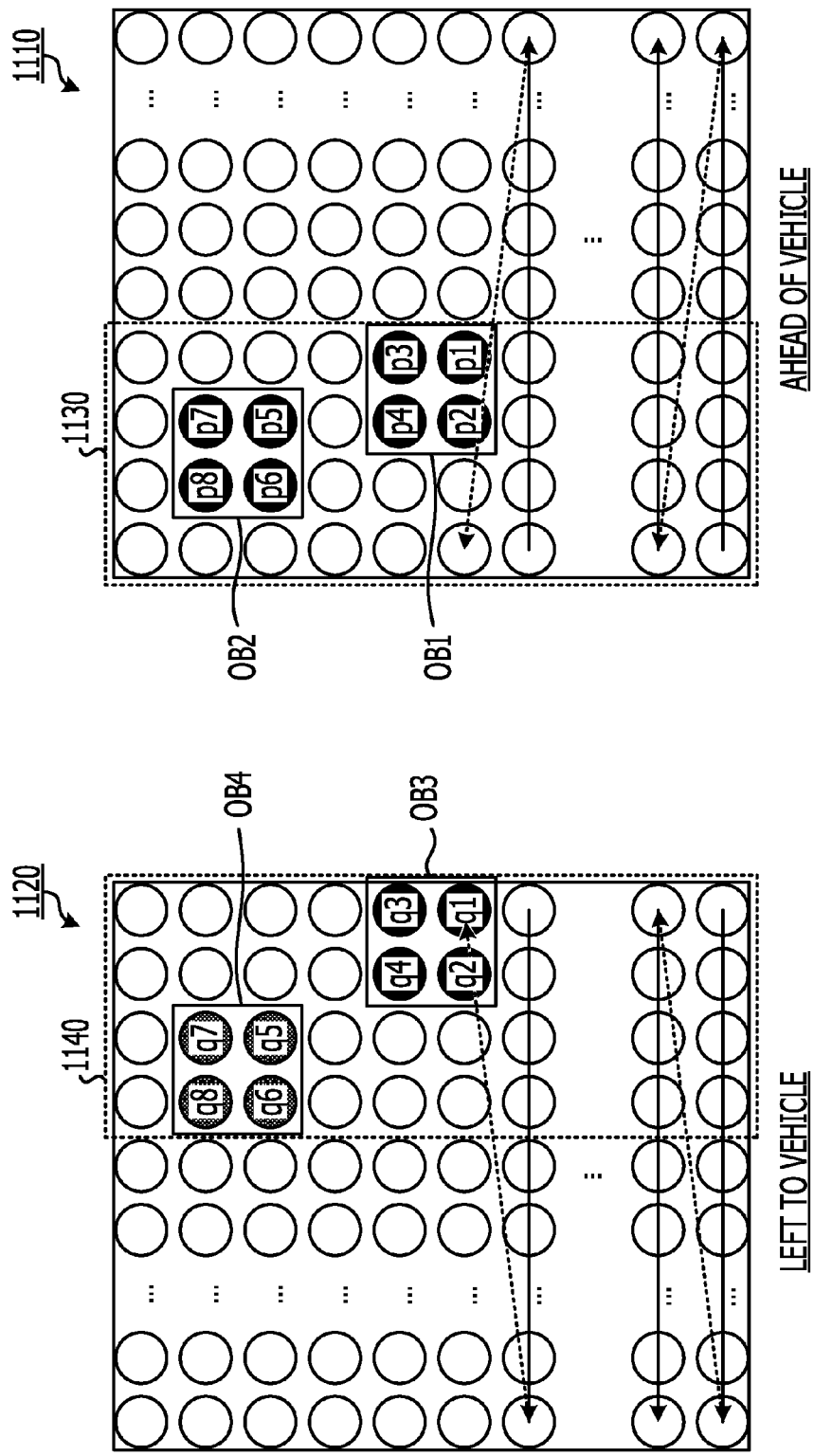
FIG. 11 is a diagram illustrating an example of a determination of results of measurement for each frame.

FIG. 11 is a diagram illustrating an example of a determination using results of measurement for each frame. In FIG. 11, a result 1110 is a result of measurement for each frame performed by the laser radar device Mi (front of the vehicle V). A result 1120 is a result of measurement for each frame performed by the laser radar device M4 (left of the vehicle V).

In FIG. 11, solid circles indicate results of measurement in which positional information regarding an object has been obtained. In FIG. 11, hollow circles indicate results of measurement in which positional information regarding an object has not been obtained. The results 1110 and 1120 are obtained by the laser radar devices M1 and M4, respectively, in the same period. Results of measurement included in a broken-line frame 1130 indicate results of measurement of the overlap region A of the result 1110. Results of measurement included in a broken-line frame 1140 indicate results of measurement of the overlap region A of the result 1120.

In this case, for example, the determination unit 1003 determines whether or not the coordinate positions of objects obtained from results p1, p2, p3, p4, p5, p6, p7, and p8 included in the broken-line frame 1130 and the coordinate positions of objects obtained from results q1, q2, q3, q4, q5, q6, q7, and q8 included in the broken-line frame 1140 match.

Now, assume that the coordinate position of an object obtained from the result p1 and the coordinate position of an object identified from the result q1 match. In this case, the detection unit 1004 determines that there is an object at the coordinate position obtained from the result p1 (result q1). In addition, assume that the coordinate position of an object obtained from the result p2 and the coordinate position of an object identified from the result q2 match. In this case, the detection unit 1004 determines that there is an object at the coordinate position obtained from the result p2 (result q2).

In addition, assume that the coordinate position of an object obtained from the result p3 and the coordinate position of an object identified from the result q3 match. In this case, the detection unit 1004 determines that there is an object at the coordinate position obtained from the result p3 (result q3). In addition, assume that the coordinate position of an object obtained from the result p4 and the coordinate position of an object identified from the result q4 match. In this case, the detection unit 1004 determines that there is an object at the coordinate position obtained from the result p4 (result q4).

An actual object is not a point but has volume, and, for example, recognized as having a shape according to an angle and a distance between adjacent results. Therefore, in the example illustrated in FIG. 11, objects OB1 and OB2 are recognized in the result 1110, and objects OB3 and OB4 are recognized in the result 1120. On the basis of the above-described results, the objects OB1 and OB3 (actually a single object) are determined as actually existing objects, and the objects OB2 and OB4 are determined as erroneously detected objects.

(Example of Objects in Three-Dimensional Space)

Figure 12:
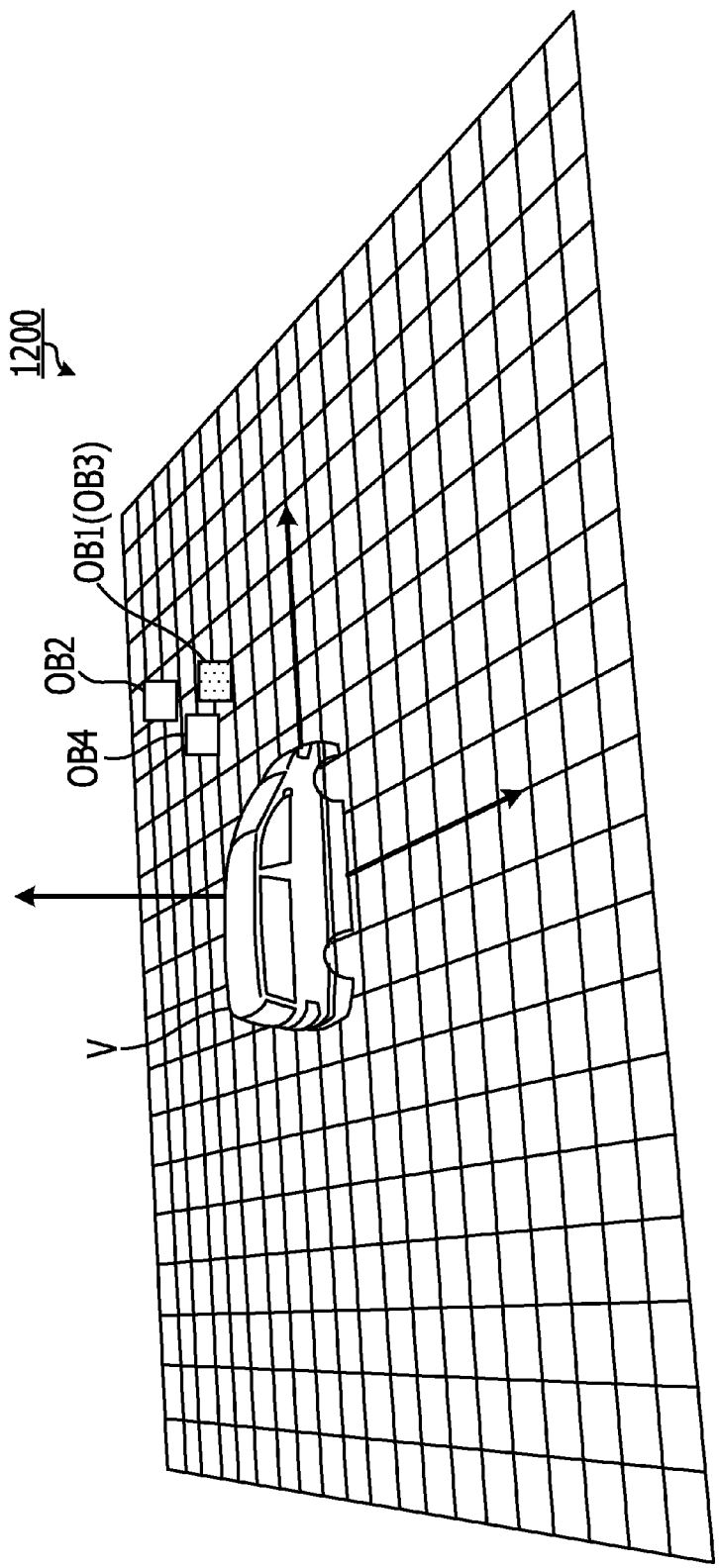
FIG. 12 is a diagram illustrating an example of objects existing around the vehicle.

FIG. 12 is a diagram illustrating an example of objects existing around the vehicle V. In FIG. 12, the objects OB1 to OB4 existing around the vehicle V are indicated in a spatial coordinate system 1200. As described above, the object OB1 (object OB3) is an actually existing object, and the objects OB2 and OB4 are erroneously detected objects.

(Detection Processing Procedure Performed by Control Device 101)

Next, a detection processing procedure performed by the control device 101 according to the embodiment will be descried. Here, the detection processing procedure performed by the control device 101 that detects objects existing around the vehicle V on the basis of a result of measurement for each frame performed by the laser radar device Mi will be described.

In the following description, a result of measurement for each frame performed by the laser radar device Mi may be referred to as a "result Fi". In addition, a plurality of results included in the result Fi may be referred to as "results Fi-1 to Fi-K", and an arbitrary one of the results Fi-1 to Fi-K may be referred to as a "result Fi-k" (k=1, 2, . . . , or K).

Figure 13:
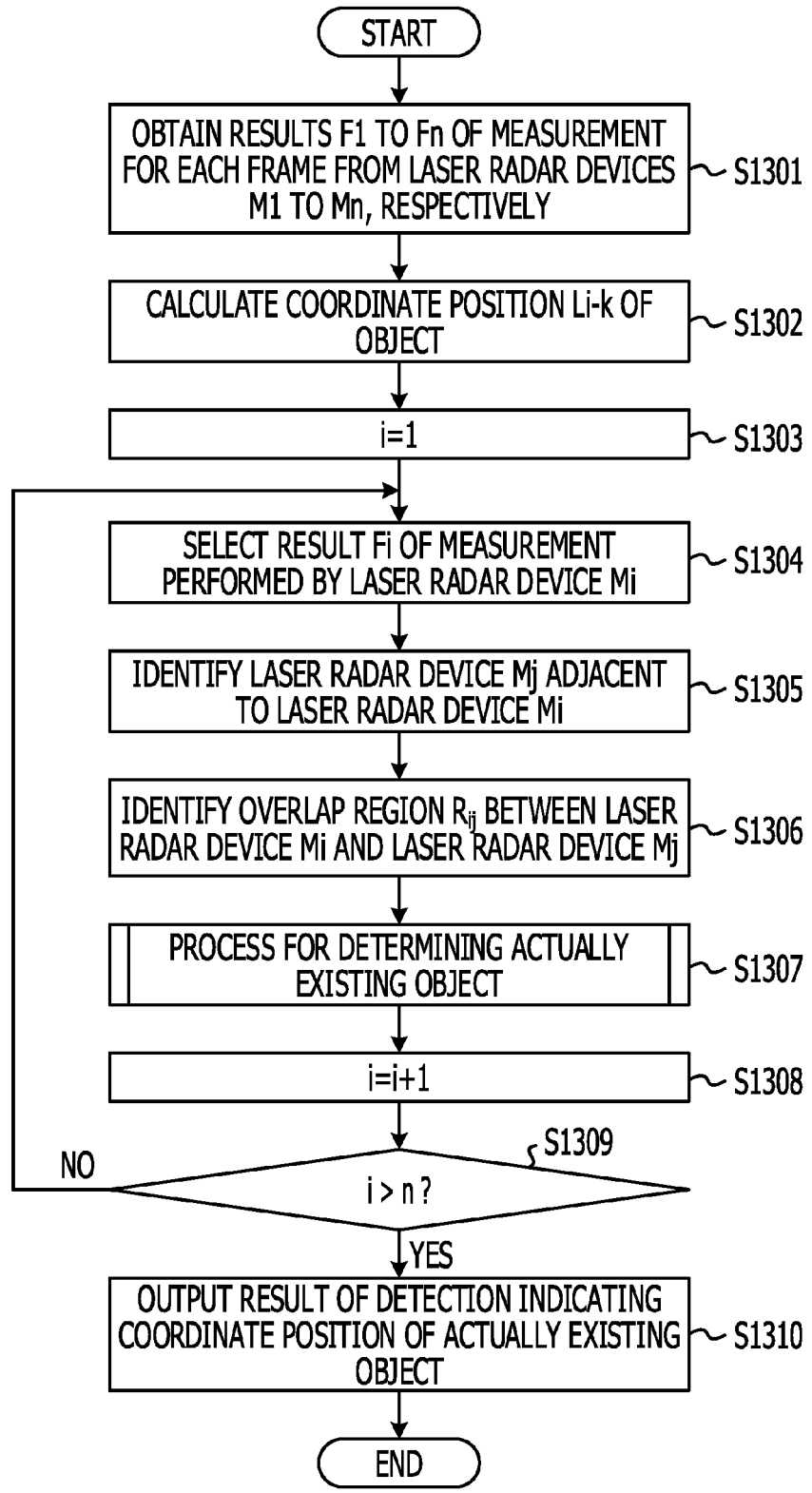
FIG. 13 is a flowchart illustrating an example of a detection processing procedure performed by the control device.

FIG. 13 is a flowchart illustrating an example of the detection processing procedure performed by the control device 101. In the flowchart of FIG. 13, first, the control device 101 obtains results F1 to Fn for each frame from the laser radar devices M1 to Mn, respectively (step S1301). Here, the results F1 to Fn are results of measurement performed by the laser radar devices M1 to Mn, respectively, in the same period.

Next, the control device 101 calculates a coordinate position Li-k of an object on the basis of a result Fi-k included in the obtained result Fi and the mounted position of the laser radar device Mi (step S1302). However, a result Fi-k indicating that no object has been detected is not used to calculate the coordinate position of an object.

Next, the control device 101 determines "i" of the laser radar device Mi as "1" (step S1303), and selects the result Fi of measurement performed by the laser radar device Mi among the laser radar devices M1 to Mn (step S1304).

The control device 101 then refers to the device information table 800 and identifies the laser radar device Mj adjacent to the laser radar device Mi (step S1305). Next, the control device 101 refers to the device information table 800 and identifies the overlap region overlap region $R_{ij}$ between the laser radar device Mi and the laser radar device Mj (step S1306).

The control device 101 then executes a process for determining an actually existing object (step S1307). A specific processing procedure of the process for determining an actually existing object will be described later with reference to FIG. 14. Next, the control device 101 increases "i" of the laser radar device Mi by 1 (step S1308), and determines whether or not "i" has become larger than "n" (step S1309).

If "i" is smaller than or equal to "n" (NO in step S1309), the control device 101 causes the procedure to return to step S1304. On the other hand, if "i" is larger than "n" (YES in S1309), the control device 101 outputs a result of detection indicating the coordinate position of an actually existing object (step S1310), and ends the procedure illustrated in the flowchart.

FIG. 14 is a flowchart illustrating an example of a specific processing procedure of the process for determining an actually existing object. In the flowchart of FIG. 14, first, the control device 101 determines whether or not there is an object in the overlap region $R_{ij}$ on the basis of the result Fi of measurement performed by the laser radar device Mi (step S1401).

Here, if there is no object in the overlap region $R_{ij}$ (NO in step S1401), the control device 101 causes the process to proceed to step S1407. On the other hand, if there is an object in the overlap region $R_{ij}$ (YES in step S1401), the control device 101 selects a result Fi-k indicating positional information regarding the object that has not been selected from among results of measurement of the overlap region $R_{ij}$ in the result Fi of measurement performed by the laser radar device Mi (step S1402).

Next, the control device 101 determines whether or not there is an object detected by the laser radar device Mj at a coordinate position Li-k of the object obtained from the selected result Fi-k on the basis of the result Fj of measurement performed by the laser radar device Mj (step S1403). The coordinate position Li-k of the object is the coordinate position of the object calculated in step S1302 illustrated in FIG. 13.

Here, if there is an object detected by the laser radar device Mj (YES in step S1403), the control device 101 determines that the object at the coordinate position Li-k as is an actually existing object (step S1404), and causes the process to proceed to step S1406. On the other hand, if there is no object detected by the laser radar device Mj (NO in step S1403), the control device 101 determines that the object at the coordinate position Li-k is an erroneously detected object (step S1405).

Next, whether or not there is a result indicating positional information regarding an object that has not been selected among the results of measurement of the overlap region $R_{ij}$ in the result Fi of the measurement performed by the laser radar device Mi is determined (step S1406). Here, if there is a result that has not been selected (YES in step S1406), the control device 101 causes the process to return to step S1402.

On the other hand, if there is no result that has not been selected (NO in step S1406), the control device 101 determines whether or not there is an object in another region different from the overlap region $R_{ij}$ on the basis of the result Fi of the measurement performed by the laser radar device Mi (step S1407).

Here, if there is an object in another region (YES in step S1407), the control device 101 determines that the object in the other region is an actually detected object (step S1408), and causes the process to return to the step in which the process for determining an actually existing object is initiated. On the other hand, if there is no object in another region (NO in step S1407), the control device 101 causes the process to return to the step in which the process for determining an actually existing object is initiated.

Thus, objects existing around the vehicle V may be detected while avoiding erroneous detection of an object in the overlap region $R_{ij}$ between the adjacent laser radar devices Mi and Mj.

If a plurality of laser radar devices Mj adjacent to the laser radar device Mi are detected in step S1305, for example, the control device 101 executes the processing in steps S1306 and S1307 for each laser radar device Mj. In addition, when the process for determining an actually existing object has already been executed for a certain overlap region $R_{ij}$, the control device 101 may omit the process for determining an actually existing object for the certain overlap region $R_{ij}$.

As described above, according to the object detection apparatus 100 according to the embodiment, the scan ranges of the laser radar devices Mi and Mj may be scanned in opposite directions such that the timings at which the laser radar devices Mi and Mj scan the overlap region $R_{ij}$ match. Therefore, the laser radar devices Mi and Mj may intentionally detect objects erroneously detected by receiving reflected light of laser light emitted from the adjacent laser radar devices in the overlap region $R_{ij}$.

In addition, according to the object detection apparatus 100, it is possible to determine whether or not the coordinate position Fi of an object obtained from the result Fi of measurement of the overlap region $R_{ij}$ performed by the laser radar device Mi and the coordinate position Fj of an object obtained from the result Fj of measurement of the overlap region $R_{ij}$ performed by the laser radar device Mj match. According to the object detection apparatus 100, if it is determined that the coordinate positions Fi and Fj of the objects match, an object existing in the overlap region $R_{ij}$ may be detected. Therefore, among objects existing in the overlap region $R_{ij}$ detected by the laser radar devices Mi and Mj, an object detected by both the laser radar devices Mi and Mj may be determined as an actually existing object, and objects other than the foregoing object may be determined as erroneously detected objects.

In addition, according to the object detection apparatus 100, it is possible to detect an object existing in another region different from the overlap region $R_{ij}$ on the basis of a result of measurement of the other region different from the overlap region $R_{ij}$ performed by the laser radar device Mi. In addition, according to the object detection apparatus 100, it is possible to detect an object existing in another region different from the overlap region $R_{ij}$ on the basis of a result of measurement of the other region different from the overlap region $R_{ij}$ performed by the laser radar device Mj.

In addition, according to the object detection apparatus 100, it is possible to output the coordinate position of a detected object in the overlap region $R_{ij}$ or the coordinate position of a detected object in another region different from the overlap region $R_{ij}$. Therefore, for example, objects existing around the vehicle V may be displayed on the display 320 or the like in three dimensions, thereby supporting operation and parking of the vehicle V.

Thus, according to the object detection apparatus 100, erroneous detection of an object in the overlap region $R_{ij}$ caused when the laser radar device Mi or Mj receives reflected light of laser light emitted from the other laser radar device may be avoided, which improves the accuracy of detecting an object existing around the vehicle V, a building, or the like.

The method for detecting an object described in the embodiment may be realized by executing a prepared program using a computer such as a personal computer or a work station. The object detection program is recorded on a computer-readable recording medium such as a hard disk, a flexible disk, a compact disc read-only memory (CD-ROM), a magneto-optical (MO) disk, or a digital versatile disc (DVD), and executed when read from the recording medium using a computer. The object detection program may be distributed through a network such as the Internet.

In addition, the object detection apparatus 100 described in the embodiment may be realized by an application-specific integrated circuit (ASIC) such as a standard cell or a structured ASIC or programmable logic device (PLD) such as a field-programmable gate array (FPGA).

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An object detection apparatus, comprising:
    a first radar configured to measure first positional information regarding a first object existing in a first scan range on the basis of first reflected wave of first wave radiated onto the first scan range including a first region;
    a second radar configured to measure second positional information regarding a second object existing in a second scan range on the basis of second reflected wave of second wave radiated onto the second scan range including the first region and a second region, which is located outside the first scan range, the second wave being radiated in such a way as to scan the first region in a direction opposite a direction in which the first radar radiates the first wave at a timing at which the first radar scans the first region; and
    a processor configured to:
    determine, when a first position relating to the first positional information and a second position relating to the second positional information are included in the first region, whether the first position and the second position match, and
    detect a third object existing in the first scan range when the first position and the second position match.

2. The object detection apparatus according to claim 1,
    wherein the first scan range includes a third region, which is located outside the first region, and
    wherein the processor detects fourth object existing in the second region or the third region on the basis of a result of measurement of the third region performed by the first radar or a result of measurement of the second region performed by the second radar.

3. The object detection apparatus according to claim 2,
    wherein the processor outputs a position of the third object existing in the first region or another position of the fourth object existing in the second region or the third region.

4. The object detection apparatus according to claim 1,
    wherein the processor calculates the first position on the basis of a first mounted position of the first radar and a result of measurement of the first region performed by the first radar, and
    wherein the processor calculates the second position on the basis of a second mounted position of the second radar and a result of measurement of the first region performed by the second radar.

5. A method for detecting an object executed by a computer, the method comprising:
    obtaining a first result of measurement from a first radar that measures first positional information regarding a first object existing in a first scan range on the basis of first reflected wave of first wave radiated onto the first scan range;
    obtaining a second result of measurement from a second radar that measures second positional information regarding a second object existing in a second scan range on the basis of second reflected wave of second wave radiated onto the second scan range including a first region, which is located inside in the first scan range, and a second region, which is located outside the first scan range, the second wave being radiated in such a way as to scan the first region in a direction opposite a direction in which the first radar radiates the first wave at a timing at which the first radar scans the first region;
    determining, when a first position relating to the first positional information and a second position relating to the second positional information are included in the first region, whether the first position and the second position match; and
    detecting a third object existing in the first scan region when the first position and the second position match.

6. The method according to claim 5,
    wherein the first scan range includes a third region, which is located outside the first region, and
    the method further comprising:
    detecting fourth object existing in the second region or the third region on the basis of a result of measurement of the third region performed by the first radar or a result of measurement of the second region performed by the second radar.

7. The method according to claim 6, further comprising:
    outputting a position of the third object existing in the first region or another position of the fourth object existing in the second region or the third region.

8. The method according to claim 5,
    wherein the determining calculates the first position on the basis of a first mounted position of the first radar and a result of measurement of the first region performed by the first radar, and calculates the second position on the basis of a second mounted position of the second radar and a result of measurement of the first region performed by the second radar.

9. The A computer-readable recording medium storing a program for causing a computer to execute a procedure for detecting an object, the procedure comprising:
    obtaining a first result of measurement from a first radar that measures first positional information regarding a first object existing in a first scan range on the basis of first reflected wave of first wave radiated onto the first scan range;
    obtaining a second result of measurement from a second radar that measures second positional information regarding a second object existing in a second scan range on the basis of second reflected wave of second wave radiated onto the second scan range including a first region, which is located inside in the first scan range, and a second region, which is located outside the first scan range, the second wave being radiated in such a way as to scan the first region in a direction opposite a direction in which the first radar radiates the first wave at a timing at which the first radar scans the first region;
    determining, when a first position relating to the first positional information and a second position relating to the second positional information are included in the first region, whether the first position and the second position match; and
    detecting a third object existing in the first scan region when the first position and the second position match.

10. The computer-readable recording medium according to claim 9,
    wherein the first scan range includes a third region, which is located outside the first region, and the method further comprising:
  detecting a fourth object existing in the second region or the third region on the basis of a result of measurement of the third region performed by the first radar or a result of measurement of the second region performed by the second radar.

11. The computer-readable recording medium according to claim 10, the procedure further comprising:
  outputting a position of the third object existing in the first region or another position of the fourth object existing in the second region or the third region.

12. The computer-readable recording medium according to claim 9,
  wherein the determining calculates the first position on the basis of a first mounted position of the first radar and a result of measurement of the first region performed by the first radar, and calculates the second position on the basis of a second mounted position of the second radar and a result of measurement of the first region performed by the second radar.

* * * * *

UNITED STATES PATENT AND TRADEMARK OFFICE
CERTIFICATE OF CORRECTION

| | |
|---|---|
| PATENT NO. | : 9,046,599 B2 |
| APPLICATION NO. | : 13/945212 |
| DATED | : June 2, 2015 |
| INVENTOR(S) | : Takeshi Morikawa et al. |

It is certified that error appears in the above-identified patent and that said Letters Patent is hereby corrected as shown below:

In the claims

Claim 9, Column 20, Line 38:

Delete "The A" and insert --A--, therefor.

Signed and Sealed this
Thirteenth Day of October, 2015

Michelle K. Lee
*Director of the United States Patent and Trademark Office*